United States Patent [19]

Stephen et al.

[11] Patent Number: 4,989,774
[45] Date of Patent: Feb. 5, 1991

[54] STRUCTURAL BOX BEAMS

[75] Inventors: David Stephen; Martin H. Mansbridge; David J. Irwin, all of Bristol, England

[73] Assignee: British Aerospace Public Limited Company, London, England

[21] Appl. No.: 394,984

[22] Filed: Aug. 17, 1989

[30] Foreign Application Priority Data

Aug. 17, 1988 [GB] United Kingdom ............... 8819535

[51] Int. Cl.$^5$ .............. B64C 1/26; B64C 3/20; B23K 101/02; B23K 103/14
[52] U.S. Cl. ................... 228/157; 244/124; 244/131; 29/889.72
[58] Field of Search ............... 416/233; 244/123, 124, 244/131; 428/593; 228/157, 165

[56] References Cited

U.S. PATENT DOCUMENTS

| | | | |
|---|---|---|---|
| 4,087,037 | 5/1978 | Schier et al. | 228/157 X |
| 4,292,375 | 9/1981 | Ko | 228/157 X |
| 4,294,419 | 10/1981 | Fouse et al. | 228/265 X |
| 4,304,821 | 12/1981 | Hayase et al. | 228/157 X |
| 4,632,296 | 12/1986 | Mansbridge et al. | 228/157 |
| 4,642,863 | 2/1987 | Schulz | 228/157 X |
| 4,882,123 | 11/1989 | Weisert et al. | 228/157 X |

FOREIGN PATENT DOCUMENTS 0181203  5/1986  European Pat. Off. .
0245548  11/1987  European Pat. Off. .

OTHER PUBLICATIONS

"Superplastic Forming/Diffusion Bonding", publication NA-77-902, Rev 8-78 by Rockwell International.

Primary Examiner—Kenneth J. Ramsey
Attorney, Agent, or Firm—Cushman, Darby & Cushman

[57] ABSTRACT

A structural box beam of the type formed by a method using superplastic forming and diffusion bonding techniques (SPF/DB). The basis is a SPF/DB four sheet cellular structure box beam, for particular application to a flap track beam for aircraft, said box beam including integrally formed flap track flanges and corrugated shear webs. The corrugations serve the dual purpose of reacting local track bending moments. Internal shear webs are integrally formed as part of the cellular structure. The box beam is designed to be manufactured from a flat blank assembly consisting of four chemically-etched sheets with local reinforcements placed between the core and skin sheets providing a low cost means of tailoring the beam to minimum thickness requirements.

6 Claims, 8 Drawing Sheets

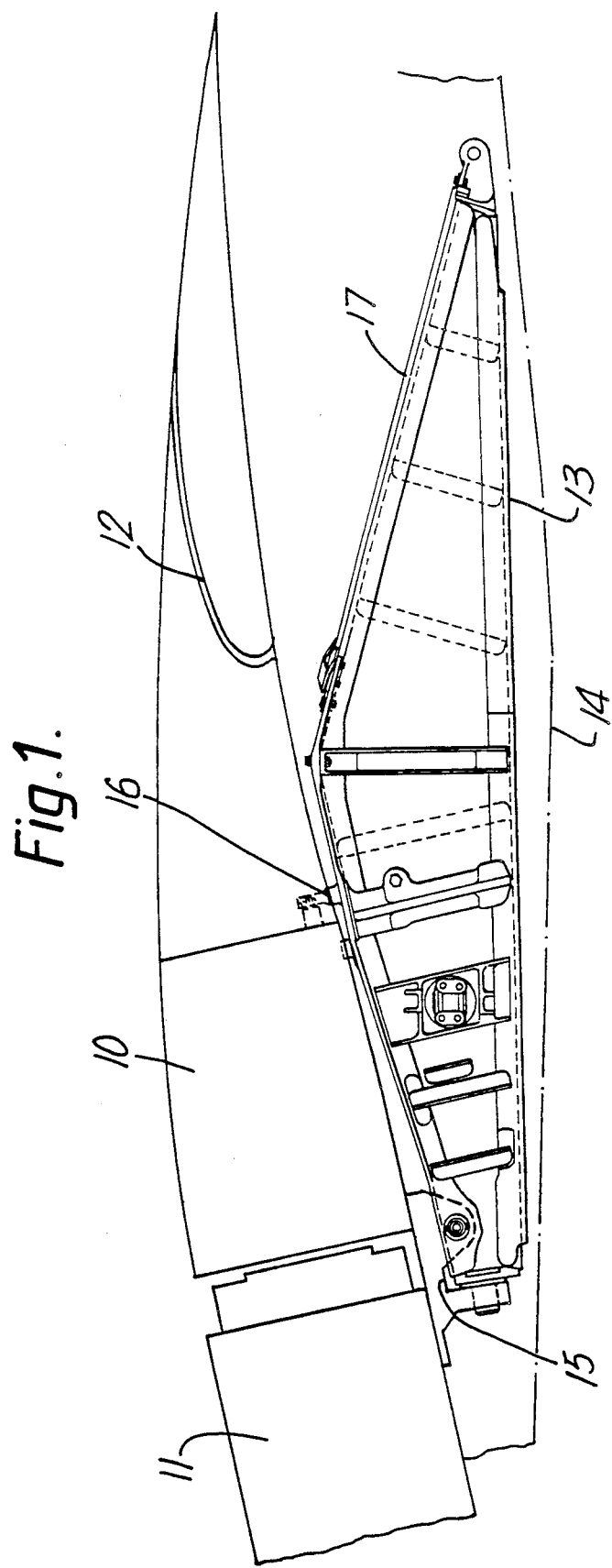

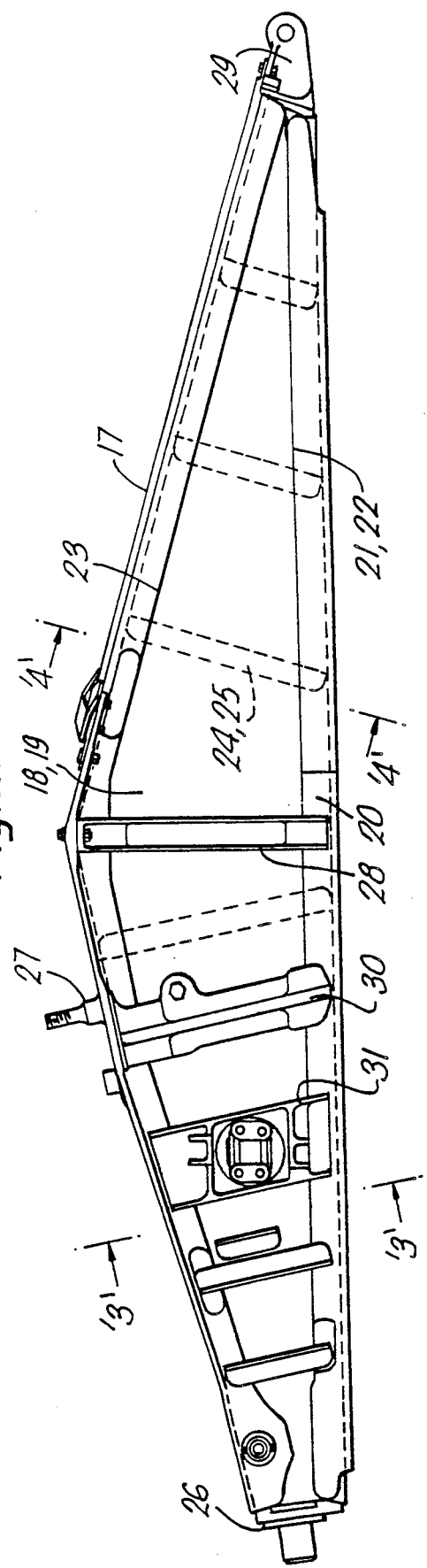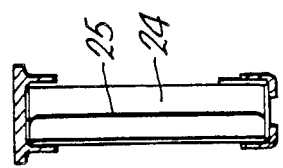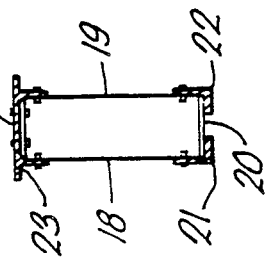

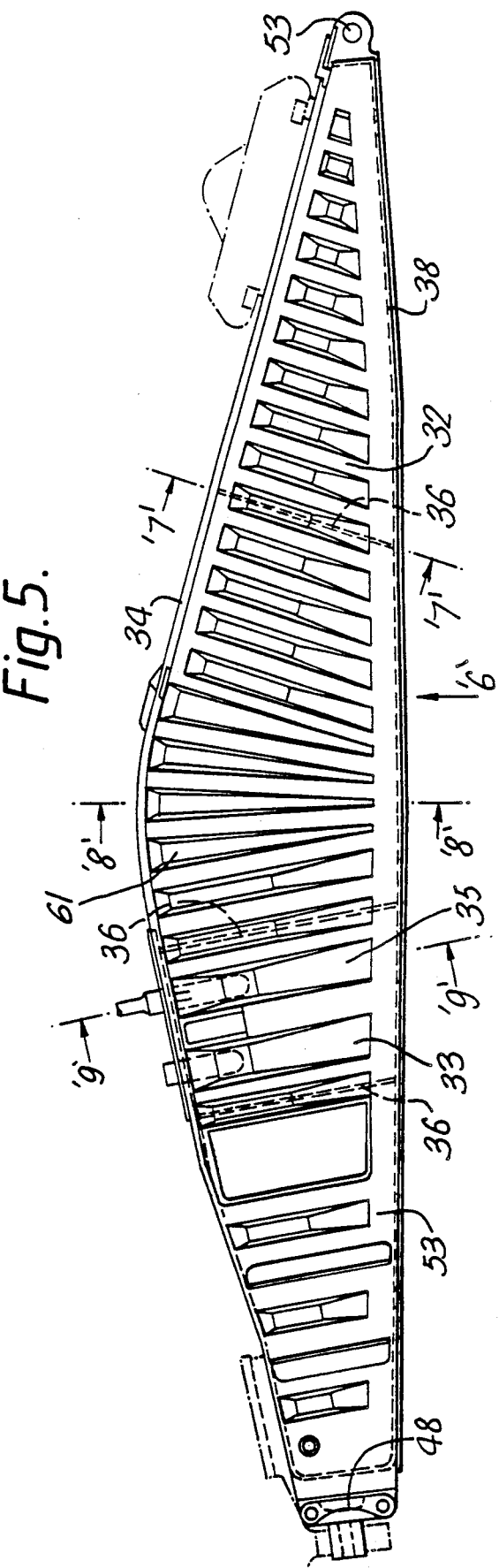

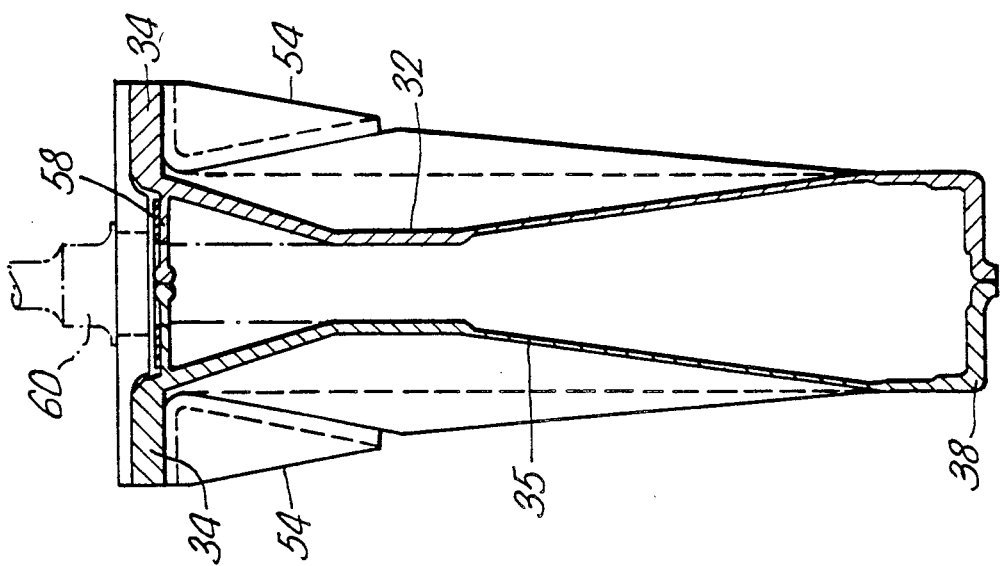
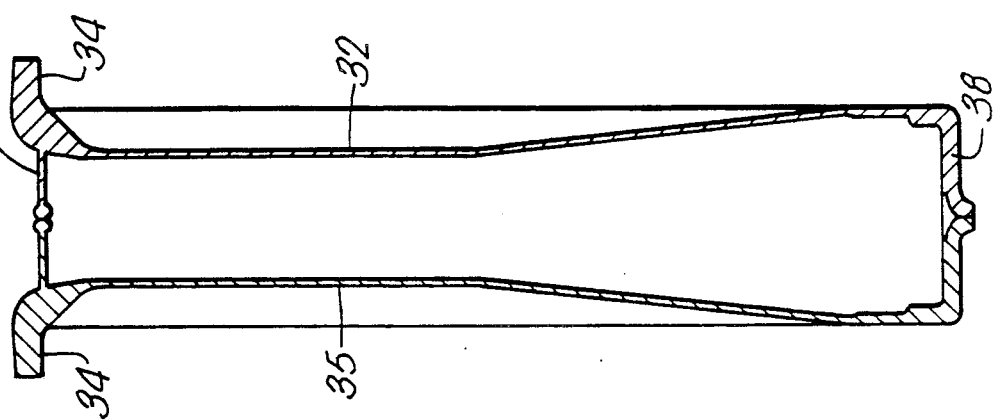
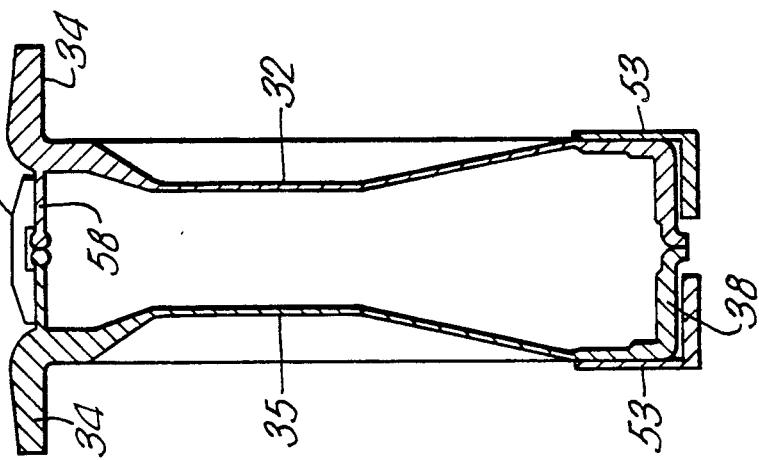

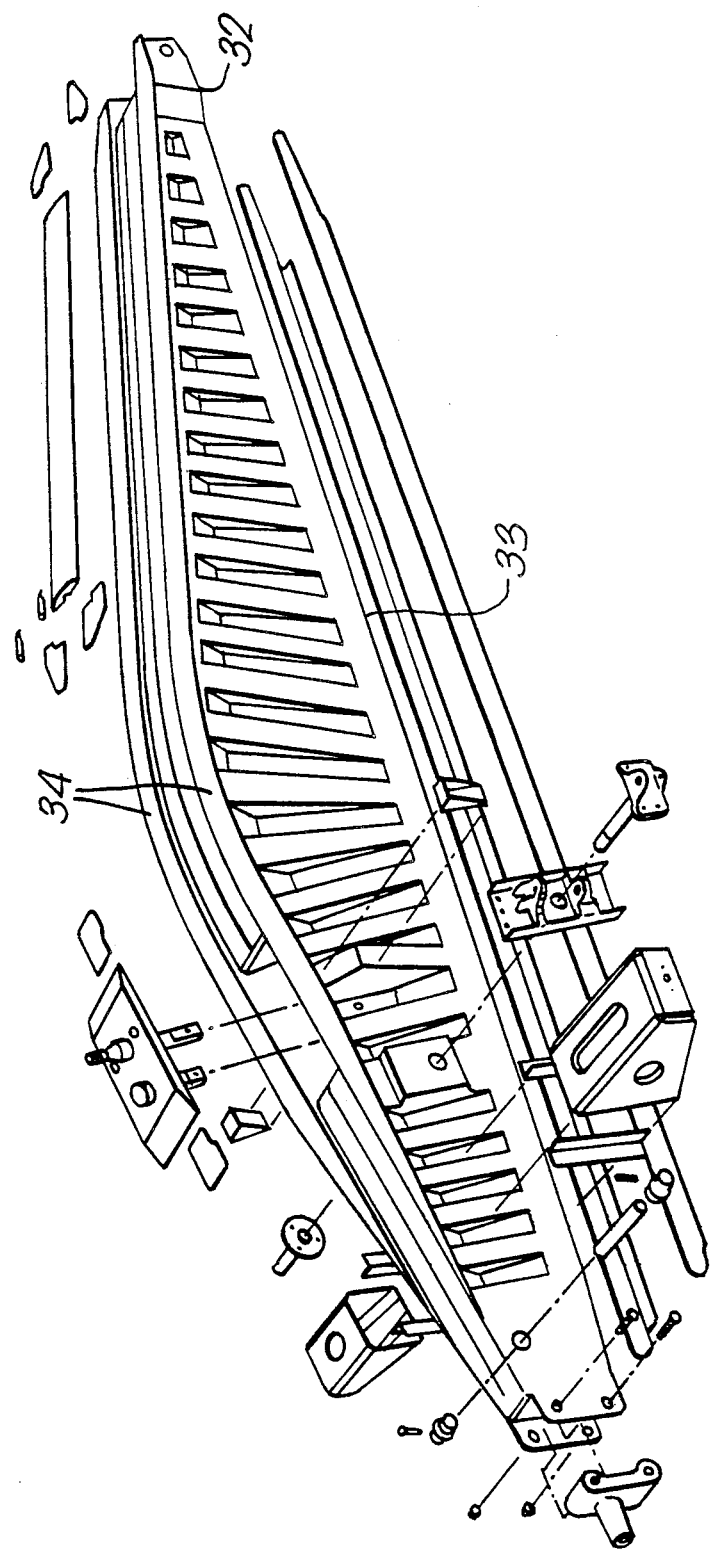

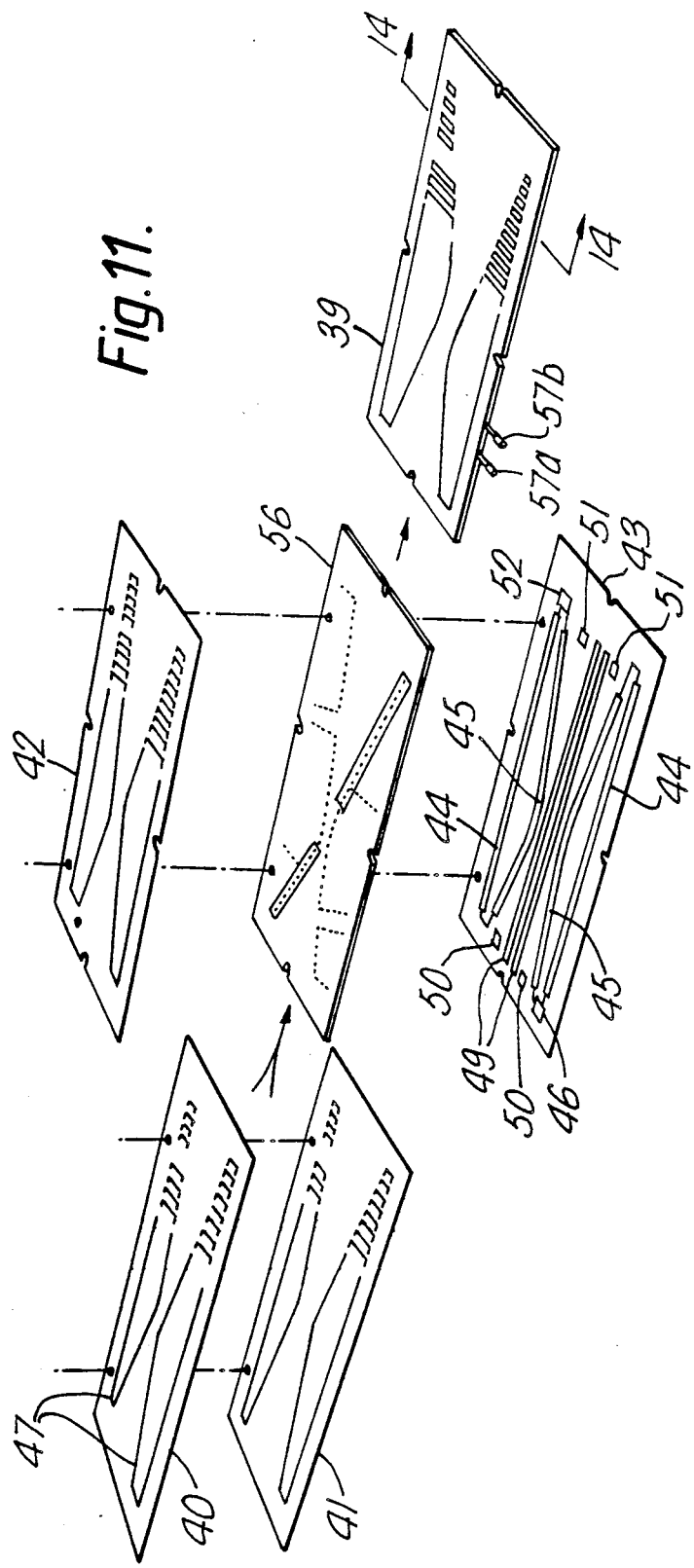

STRUCTURAL BOX BEAMS

This invention relates to structural box beams of the type formed by a method using superplastic forming and diffusion bonding techniques. It particularly relates to a wing flap track beam for aircraft.

In the particular example of a wing flap track beam, two or more beams are cantilever mounted and extend rearwardly from the wing trailing edge structure. They support the flap in its position with respect to the wing so that when retracted it conforms to the aerodynamic wing profile but furthermore include flap engaging tracks or guideway means by which means the flap moves rearwardly over a range of operational settings.

Wing flap track beams can take numerous forms. They may be of forged constructed or of fabricated structural box beam configuration, the latter incorporating the flap engaging tracks or guideway means and providing an efficient structure in bending and torsion.

The benefits of the structural box beam arrangement is particularly important as aircraft design progresses towards larger flaps and higher induced loads or adopt variable camber or are programmed in their adoption of flap angular settings which demand a greater variation in track shapes.

Conventional fabricated flap track beams generally comprise a combination of machined flap track or guideway components incorporated into a fabricated box structure, the whole being a combination of conventional forging, extruding, machining, bolting and riveting techniques. Such fabricated structures, in addition to incorporating machined trackway portions for slidably engaging the flap include shear webs, a multiplicity of shear web stiffeners and miscellaneous fittings.

Numerous shortcomings can arise in fabricated box structures in terms of manufacture and inspection. There may be complication in the assembly of a multiplicity of parts particularly in respect of internal stiffeners and support structure and the need for accurate positioning of the machined trackway portion upon the box structure. Fabricated structures may necessitate a larger structure than is necessary which may be costly in weight terms and its complexity of construction makes inspection difficult, particularly internal inspection due to the large numbers of necessary internal parts.

It is the object of the present invention to provide a structural box beam, for example a wing flap track beam, in which the sum total of the structural elements including the principal load carrying boom members which constitute, in use, flap engaging trackways are formed as an integral structure in a single moulding operation by a method using superplastic forming and diffusion bonding techniques such as described in our patent specifications GB 2,030,480B and U.S. Pat. No. 4,351,470. The significant distinction over known arrangements is that (a) the boom members of significant cross-sectional areas are moulded as an integral part of the box structure but the horizontal flanges protrude external to each side of the box structure, (b) simultaneous moulding of the boom members ensure integration with the vertical shear web corrugations so that these corrugations in addition to stabilising the shear web also, in use, react localised bending moments in the beam flanges, (c) in the arrangement, as described, where the boom members require to be kinked at some point along their length, integral moulding allows for a gently curving longitudinal profile and the corrugations in the vicinity of the kink can be conveniently positioned to react induced kink loads.

According to the present invention there is provided a four sheet cellular structural box beam including two substantially parallel longitudinal corrugated shear webs, two or more transverse shear diaphragms interconnecting said corrugated shear webs at spaced apart locations along the length thereof and longitudinal transverse shear webs extending substantially over the length of the box beam adjacent it upper and lower boundaries and upper and lower boom elements at said upper and lower boundaries, at least said upper boom elements having substantially horizontal said flanges protruding outwardly from each corrugated shear web along their length said cellular structural box beam being of the type formed by a superplastic forming and diffusion bonding method including the steps of:

positioning first and second metal sheets, each capable of superplastic deformation and diffusion bonding, in face to face relationship;

attaching the sheets together at a series of spaced substantially continuous joint lines across their faces;

positioning third and fourth metal sheets, each capable of superplastic deformation and diffusion bonding respectively adjacent said first and second metal sheets, fixedly inserting supplementary metal laminations each capable of superplastic deformation and diffusion bonding at selected locations between said first and third and said second and fourth metal sheets;

sealingly attaching the four metal sheets together along their common periphery so that said first and second metal sheets form at least one inflatable envelope and said third and fourth metal sheets form a single inflatable envelope about said first and second metal sheets;

clamping said sheets between upper and lower tool parts respectively of a forming mould and heating said forming mould and said sheets to within a temperature range at which the sheets exhibit superplastic characteristics;

inflating said third and fourth metal sheets in aid forming mould to deform the sheets in conformity with the mould surface said forming mould configured to corrugate said sheets;

subsequently inflating said first and second sheets sufficiently to cause the or each envelope in the areas determined by the said continuous joint lines to expand in balloon like fashion to form cavities, of generally rectangular shape when neighbouring regions of the cavities forming walls meet and the said sheets contact and adopt the configuration of the already formed outer sheets;

characterised in that continuing inflatory pressure on said first and second sheets causes at least some of said laminate material to be moulded around said forming mould and said formed third and fourth sheets to form at least said outwardly protruding substantially horizontal side flanges and on completion of the forming cycle diffusion bonding occurs between the abutment surfaces of the respective component parts.

One embodiment of the invention will now be described by way of example only and with reference to the accompanying drawings in which:

FIG. 1 illustrates a flap track beam located upon an aircraft wing.

FIG. 2 illustrates in side elevation a known flap track beam of fabricated box structure configuration.

FIG. 3 is a section through the fabricated flap track beam taken along a line 3—3 in FIG. 2.

FIG. 4 is a further section through the fabricated flap track beam taken along a line 4—4 in FIG. 2.

FIG. 5 illustrates a side elevation on a flap track beam in accordance with the present invention.

FIG. 6 is a plan view on the lower surface of a flap track beam viewed in direction of Arrow '6' in FIG. 5.

FIG. 7 is a section through a flap track beam of the present invention taken along a line 7—7 in FIG. 5.

FIG. 8 is a further section taken along a line 8—8 in FIG. 5.

FIG. 9 is a further section taken along a line 9—9 in FIG. 5.

FIG. 10 is a pictorial arrangement of a flap track beam of the present invention showing in exploded arrangement a selection of miscellaneous associated component parts.

FIG. 11 illustrates the blank assembly sequence for the superplastic forming, diffusion bonding manufacture of a flap track beam.

FIG. 14 is a section through a blank assembly taken along a line 14—14 in FIG. 11.

Figure 12:
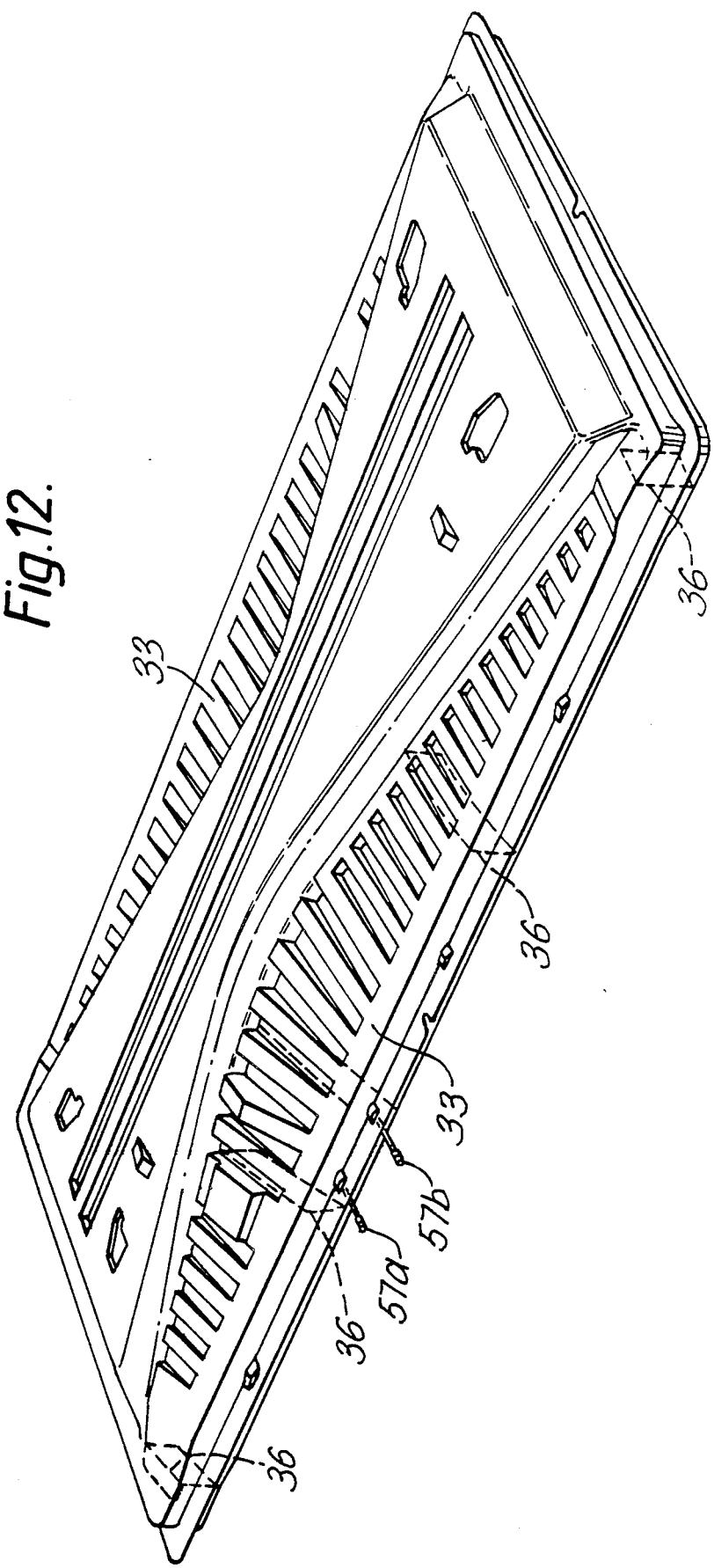
FIG. 12 illustrates pictorially a superplastically formed and diffusion bonded blank.
Figure 13:
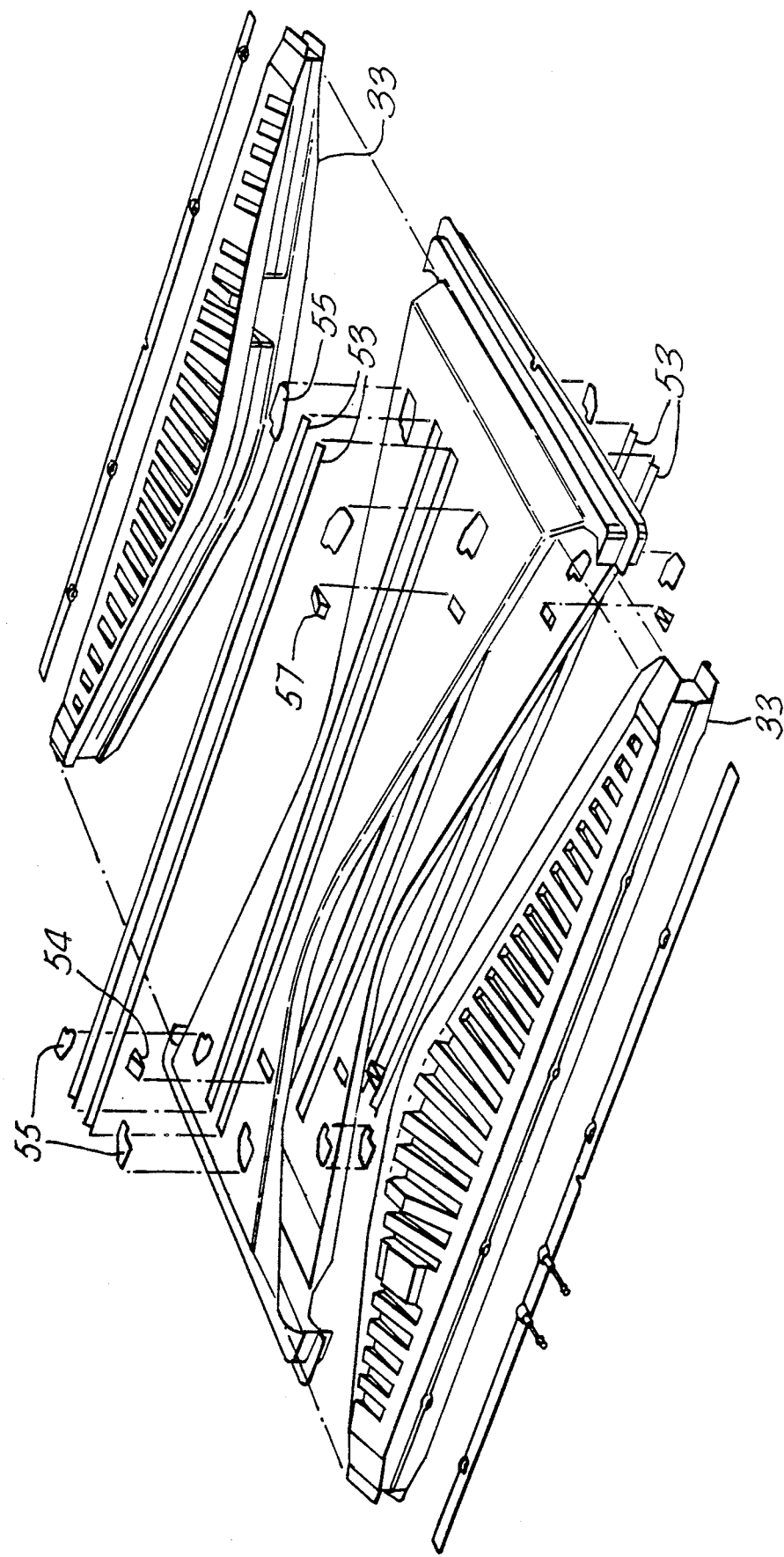
FIG. 13 illustrates pictorially a formed flap track beam pairs and detail components after separation from the superplastically formed and diffusion bonded blank.

Referring to the drawings, FIG. 1 illustrates in side elevation a trailing edge portion 10 of an aircraft wing 11 and including a trailing edge flap 12. A fabricated flap track beam 13 contained within a fairing 14 is cantilever mounted off the undersurface of the wing by means of a forward attachment assembly 15 and a rearward attachment 16. The inclined upper surface 17 of the beam comprises a flap engaging track on which the flap operating mechanism moves for flap deployment. This mechanism is omitted from the drawing for reasons of clarity but generally includes a trolley having rollers for at least engaging the upper and lower track surfaces.

FIGS. 2, 3 and 4 illustrate to a larger scale the flap track beam 13 of FIG. 1 which is of fabricated box structure configuration. It effectively comprises inner and outer shear webs 18 and 19, a channel section lower boom member 20 extending longitudinally along the length of the beam, longitudinally fail safe angles 21 and 22 and a machined top boom member 23 also extending longitudinally along the length of the beam, the rearward inclined upper surface 17 comprising the rolling surface for the flap operating mechanism as previously referred to. The assembly further comprises a series of internal, transverse shear webs and attachment angles 24, 25 (one position only is indicated by way of example), wing attachment fittings 26 and 27, externally mounted machined channel stiffener 28 positioned to react kink loads in the top boom 23 and a pivotal attachment bracket. Externally mounted machined posts 30 lie substantially co-incident with the wing attachment 27 and there is a further mounting bracket 31.

This description serves to illustrate the complexity of construction in a fabricated box structure, requiring complex jigging for the proper location of the component parts and the large number of attachments and individually manufactured component parts employed. It is therefore man-hour intensive in manufacture.

In accordance with the present invention, as illustrated in FIGS. 5-14 inclusive, there is provided a titanium flap track beam 32 formed in a single operation by superplastic forming, and diffusion bonding (SPF/DB) techniques.

The basis of the construction is an SPF/DB four sheet cellular structure box beam 33 with integrally formed trackway flanges 34 and corrugated shear webs 35. Below the trackway portion the corrugations serve the dual purpose of reacting local trackway bending moments and stabilising the shear webs in overall beam bonding. Internal transverse shear webs 36 (in lieu of fabricated diaphragms) are formed as part of the cellular structure and have been kept to a minimum in order to reduce the in-service inspection requirements. Inspection is facilitated by access holes 37 formed as integral features in the bottom boom 38.

Referring particularly to FIGS. 11 and 14 the beam is manufactured from a blank assembly 39 consisting of four pre-chemically etched sheets 40 and 41, 42 and 43.

Core sheets and 40 and 41 are chemically etched at 47 in the desired form to give selected variations of panel thickness consistent with structural and forming requirements. In the present embodiment this represents, for example the areas corresponding to corrugation locations. The outer sheets 42 and 43 are similarly etched. The core sheets 40 and 41 are brought together to form a core assembly 56 and spot welded to each other in a pre-defined line pattern to form inflatable stiffening such as transverse is subsequently sandwiched between the outer sheets 42 and 43 together with the inclusion of additional laminate material providing additional thickness for particular portions of the beam and which may be located to either the core sheets or outer sheets by tack welding. For example, the laminate material 45 provides the material for the trackway flanges 34 whilst the laminate material 44 provides the material for the bottom boom 38 so that when formed these important structural features will be of the correct cross-sectional thickness and form. Additional laminate material 46 and 52 represents reinforcement material for the forward spigot 48 and the rear pivot 53. The items marked aS 49, 50 and 51 indicate reinforcement laminates in connection with supplementary parts 53, 54 and 55 which are manufactured simultaneously with the beam and which will be referred to later. This provides a low cost route to tailoring the beam to minimum requirements. When the core sheets, outer sheets and laminate material are brought together, the whole assembly is tig welded (tungsten in inert gas) around the periphery as indicated in FIG. 14 to provide twin gas tight envelopes. The core assembly has a gas inlet port 57b communicating with the interspace between the core sheets 40 and 41 and a further port 57a communicates with the interspace between the outer sheets 42 and 43. It should be noted at this point that this sheet assembly provides for the simultaneous manufacture of two beams and the supplementary parts previously referred to and which is clearly illustrated in FIGS. 12 and 13.

As illustrated in FIG. 12, the assembly is inflated by the sequential injection of an inert gas through each gas inlet port, the component assembly being clamped between upper and lower tool parts (not shown) respectively of a forming mould into which superplastic deformation is to take place.

The forming mould and the forming blank assembly are heated to within a temperature range at which the sheets exhibit superplastic characteristics. An inert gas is admitted under pressure via port 57a initially into the outer envelope formed by the outer sheets causing these sheets to expand. Simultaneously a differential pressure is admitted via port 57a between the core sheets just sufficient to maintain separation and avoid diffusion bonding of these core sheets at that stage. Expansion of the outer envelope continues until the metal sheets contact and conform to the mould shape. Subsequently gas pressure via port 57b is increased significantly in the inner envelope. This causes the areas determined by the spot weld pattern to expand in balloon-like fashion, to form cavities. Expansion in this manner continues until the metal sheets contact and adopt the configuration of the already formed outer sheets. As pressurized gas continues to be admitted, the cavities become of generally rectangular shape when meighbouring regions of the cavities forming the walls meet. In the present arrangement these form the transverse shear webs 58 and diaphragms 36 for example.

Formation of the upper and lower booms 34 and 38 respectively occurs as a simultaneous function of the expansion process. The boom material is pre-attached for example by tack welding to either the inner surfaces of the outer sheets 42 and 43 or the outer surfaces of the core sheets 40 and 41. The forming of the upper booms 34 is particularly emphasized because these will be of significant thickness in view of the high loads which they must withstand but they are not preformed but must be inserted as flat strip at the appropriate position. The moulding of these booms occurs at the second stage, that is the expansion stage of the core sheets 40 and 41 the inert gas pressure moulding the booms integrally with the corrugations but in the final form the free flanges protrude outwardly from the box structure.

As illustrated in FIG. 10 the design provides a component having a minimum of 'add on' parts and a minimum of post SPF/DB drilling and machining. In the present embodiment as shown in FIG. 7 the upper trackway flanges 34 are interconnected by an integral transverse shear web 58.

Other advantages consequently on this method of construction include:

(a) Forming shear webs 35 inwards at selected locations, as for example indicated in FIG. 9 eliminates the need for bridge pieces, adaptors, etc., for the mounting or installation of fittings, for example the fitting 60 (shown in chain-dotted line).

(b) Eliminating the need for kink load fittings by radiusing the top of the trackway beams 34 and spreading the kink loads over a number of integral corrugation 61 (FIG. 5).

As further illustrated in FIG. 9 there is additional benefit in manufacturing certain supplementary fittings such as those itemised as 54 simultaneously by SPF/DB with the principal component. Whilst they could equally be manufactured separately, e.g., by machining, they would generally require a certain amount of fettling to ensure compatibility with the abutting part. In the case of SPF/DB this can be overcome by a once and for all fettling of the tool so that the main and abutting supplementary components will be accurately manufactured without any necessary subsequent adjustment.

Although the embodiment described utilises flat outer sheets 42 and 43 these may also be preformed prior to being assembled and tig welded to the core sheet and the miscellaneous reinforcements. Furthermore, certain component parts such as upper and lower boom material may, at least in part, comprise non-metallic materials such as carbon fibre subsequently applied externally.

We claim:

1. A four sheet cellular structural box beam including two substantially parallel longitudinal corrugated shear webs, two or more transverse shear diaphragm interconnecting said corrugated shear webs at spaced apart locations along the length thereof and longitudinal transverse shear webs extending substantially over the length of box beam adjacent its upper and lower boundaries and upper and lower boom elements at said upper boundaries and upper and lower boom elements at said upper and lower boundaries, at least said upper boom elements having substantially horizontal side flanges protruding outwardly from each corrugated shear web along their length, said cellular structural box beam being of the type formed by a superplastic forming and diffusion bonding method including the steps of:

positioning first and second metal sheets, each capable of superplastic deformation and diffusion bonding, in face to face relationship;

attaching the sheets together at a series of spaced substantially continuous joint lines across their faces;

positioning third and fourth metal sheets, each capable of superplastic deformation and diffusion bonding respectively adjacent said first and second metal sheets, fixedly inserting supplementary metal laminations each capable of superplastic deformation and diffusion bonding at selected locations between said first and third and said second and fourth metal sheets;

sealingly attaching the four metal sheets together along their common periphery so that said first and second metal sheets form at least one inflatable envelope and said third and fourth metal sheets form a single inflatable envelope about said first and second metal sheets;

clamping said sheets between upper and lower tool parts respectively of a forming mould and heating said forming mould and said sheets to within a temperature range at which the sheets exhibit superplastic characteristics;

inflating said third and fourth metal sheets in said forming mould to deform the sheets in conformity with the mould surface said forming mould configured to corrugate said sheets;

subsequently inflating said first and second sheets sufficiently to cause the or each envelope in the areas determined by the said continuous joint lines to expand in balloon like fashion to form cavities, of generally rectangular shape when neighbouring regions of the cavities forming walls meet and the said sheets contact and adopt the configuration of the already formed outer sheets;

characterised in that continuing inflatory pressure on said first and second sheets causes at least some of said laminate material to be moulded around said forming mould and said formed third and fourth sheets to form at least the top boom having said outwardly protruding substantially horizontal side flanges and on completion of the forming cycle diffusion bonding occurs between the abutment surfaces of the respective component parts.

2. A structural box beam according to claim 1 in which said first and second sheets and said third and fourth sheets are chemically etched to achieve variations in thickness in accordance with structural and forming requirements.

3. A structural box beam according to claim 1 in which said sheets when fully formed comprise substantially vertical shear webs being arranged at spaced positions along their length and the walls forming the boundaries of said cavities constitute transverse shear diaphragms and longitudinal shear webs interconnecting said corrugated shear webs.

4. A structural box beam according to claims 1 or 3 in which each top boom is integrally formed and diffusion bonded with said corrugated shear webs such that, in use, the corrugations on said corrugated shear web in addition to stabilising said shear web are able to react localised bending moments on the top boom horizontal outwardly protruding flange.

5. A structural box beam according to claim 1, 2 or 3 in which each top boom is kinked downwardly at a position along its length to stabilize the outwardly protruding flange against induced kink loads, when in use, the top flange is smoothly curving in the vicinity of the kink and the corrugated shear web is so arranged that in that vicinity the corrugations are configured to lie substantially normal to the flange profile and to apply a fixing moment to the outwardly protruding flange.

6. A structural box beam according to claim 1 or claim 2 wherein said third and fourth sheets are preformed such that they substantially confirm to the mould surface prior to commencement of the superplastic forming and diffusion bonding and cycle.

* * * * *